US 12,292,115 B2

United States Patent
Ichikawa et al.

(10) Patent No.: US 12,292,115 B2
(45) Date of Patent: May 6, 2025

(54) SEALING STRUCTURE

(71) Applicant: NOK CORPORATION, Tokyo (JP)

(72) Inventors: Hiromasa Ichikawa, Aso (JP); Eizo Hayashi, Aso (JP)

(73) Assignee: NOK CORPORATION (JP)

( * ) Notice: Subject to any disclaimer, the term of this patent is extended or adjusted under 35 U.S.C. 154(b) by 97 days.

(21) Appl. No.: 17/793,551

(22) PCT Filed: Apr. 22, 2021

(86) PCT No.: PCT/JP2021/016371
§ 371 (c)(1),
(2) Date: Jul. 18, 2022

(87) PCT Pub. No.: WO2021/246085
PCT Pub. Date: Dec. 9, 2021

(65) Prior Publication Data
US 2023/0057490 A1    Feb. 23, 2023

(30) Foreign Application Priority Data
Jun. 5, 2020   (JP) .................................. 2020-098369

(51) Int. Cl.
*F16J 15/16*   (2006.01)
*F16J 15/10*   (2006.01)

(52) U.S. Cl.
CPC .......... *F16J 15/166* (2013.01); *F16J 15/104* (2013.01)

(58) Field of Classification Search
CPC ........ F16J 15/022; F16J 15/062; F16J 15/104; F16J 15/166
See application file for complete search history.

(56) References Cited

U.S. PATENT DOCUMENTS

| 2,437,814 A | * | 3/1948 | Hallen | .................... F16J 15/56 |
| | | | | 277/584 |
| 4,468,041 A | | 8/1984 | Yoshimura et al. | |

(Continued)

FOREIGN PATENT DOCUMENTS

| JP | S51-119453 A | 10/1976 |
| JP | S58-036660 U | 3/1983 |

(Continued)

OTHER PUBLICATIONS

International Search Report (English and Japanese) issued in PCT/JP2021/016371, mailed Jul. 6, 2021; ISA/JP (5 pages).

(Continued)

*Primary Examiner* — Nicholas L Foster
(74) *Attorney, Agent, or Firm* — Harness, Dickey & Pierce, P.L.C.

(57) ABSTRACT

A sealing structure has a sealing device which is a plane seal disposed in an annular groove provided in one of two members and which seals the annular gap between the two members. The sealing device includes a seal member made of a rubber-shaped elastic body and disposed on a high-pressure side and a backup ring made of a resin mounted adjacent to the seal member on a low-pressure side of the seal member. The backup ring has a ring-like shape with ends in which a notch is formed in a part thereof, and the notch extends parallel to the thickness direction of the backup ring, and extends so as to intersect the radial direction of the backup ring. The seal member and the backup ring are disposed between the two members in a state of being pressurized from the two members, respectively.

2 Claims, 4 Drawing Sheets

(56) References Cited

U.S. PATENT DOCUMENTS

| | | | |
|---|---|---|---|
| 7,169,214 B2 | 1/2007 | Kubo et al. | |
| 7,900,934 B2* | 3/2011 | Kanagae | F16J 15/166 |
| | | | 277/584 |
| 7,900,935 B2* | 3/2011 | Kanagae | F16J 15/166 |
| | | | 277/584 |
| 9,995,394 B2* | 6/2018 | Bradshaw | F16J 15/166 |
| 10,520,086 B2* | 12/2019 | Scharrer | F16J 15/166 |
| 10,969,016 B2* | 4/2021 | Ochi | F02M 55/004 |
| 2006/0232066 A1 | 10/2006 | Kanagae et al. | |
| 2007/0222162 A1* | 9/2007 | Stoner | F16J 15/166 |
| | | | 277/589 |
| 2013/0180733 A1* | 7/2013 | Bradshaw | F16J 15/166 |
| | | | 83/13 |
| 2019/0017600 A1* | 1/2019 | Scharrer | F16J 15/166 |

FOREIGN PATENT DOCUMENTS

| | | | | |
|---|---|---|---|---|
| JP | H10-068467 A | 3/1998 | | |
| JP | 2001-161585 A | 6/2001 | | |
| JP | 2004-225852 A | 8/2004 | | |
| JP | 2013-036603 A | 2/2013 | | |
| WO | 2004-061353 A1 | 7/2004 | | |
| WO | WO-2006070568 A1 * | 7/2006 | | F16J 15/062 |

OTHER PUBLICATIONS

Notice of Reasons for Refusal for corresponding Japanese Patent Application No. 2023-094164 dated Mar. 25, 2025 with English translation (8 Pages).

\* cited by examiner

SEALING STRUCTURE

CROSS REFERENCE TO RELATED APPLICATIONS

This application is a U.S. National Phase Application under 35 U.S.C. 371 of International Application No. PCT/JP2021/016371, filed on Apr. 22, 2021, which claims priority to Japanese Patent Application No. 2020-098369, filed on Jun. 5, 2020. The entire disclosures of the above applications are expressly incorporated by reference herein.

BACKGROUND

Technical Field

The present invention relates to a sealing structure. More particularly, it relates to a sealing structure in which a seal member in a plane seal is prevented from protruding when the seal member is pressurized.

Description of the Related Art

Conventionally, pressure vessels, high-pressure tanks, and the like having a sealing structure for sealing a gap between two members by using a seal member to ensure sealing performance, have been known.

The seal member used in the sealing structure is specifically an O-ring or the like, and is classified into a plane seal and a cylindrical surface seal depending on the mounting method. The plane seal includes, for example, seal members described in JP-A-2013-36603 and JP-A-2004-225852.

Specifically, JP-A-2013-36603 discloses a pressure vessel having a seal member (see FIG. 2) provided between a resin liner and a valve.

JP-A-2004-225852 discloses a high-pressure tank in which at least one side of the liner is a split type, a seal member (see FIG. 12A) is interposed on the joint surface between the liner body and the split body over the entire circumference of the opening end, and one of the liner body and the split body is formed with a deforming part that deforms toward a sealing surface contacting to the seal member.

Here, in the pressure vessel or the high-pressure tank using the plane seal described in JP-A-2013-36603 and JP-A-2004-225852, when the seal member is pressurized, a part of the seal member may enter between two members sealed by the seal member (that is, protruding of the seal member). That is, when the seal members described in JP-A-2013-36603 and JP-A-2004-225852 are subjected to an internal pressure of a pressure vessel or the like or an external pressure, the seal members may enter a gap generated between a lid and a storage body constituting the pressure vessel or the like. Therefore, in order to prevent such a protruding, a backup ring is disposed next to the seal member.

However, in the case of high-pressure components such as a pressure vessel and a high-pressure tank, there is a tendency for generating a gap between the backup ring and a member such as a lid when the lid or the storage body is significantly deformed during use. Therefore, even when a backup ring is used in the plane seal, there is room for further improvement in the protruding of the seal member.

The present invention has been made in view of such a conventional technique, and an object of the present invention is to develop a sealing structure in which a seal member in a plane seal is prevented from protruding when the seal member is pressurized, and further, the pressure resistance is improved.

SUMMARY

According to the present invention, there is provided a sealing structure, which is described below.

[1] A sealing structure having a sealing device which is a plane seal disposed in an annular groove provided in one member of two members and which seals a gap between the two members, wherein
the sealing device includes a seal member made of a rubber-like elastic body disposed on a high-pressure side, and a backup ring made of a resin and mounted adjacent to the seal member on a low-pressure side of the seal member,
the backup ring has a ring-like shape with ends which has a notch,
the notch extends parallel to a thickness direction of the backup ring and extends so as to intersect a radial direction of the backup ring, and
the seal member and the backup ring are disposed between the two members, each pressurized from the two members.

[2] The sealing structure according to [1], wherein the notch intersects the radial direction of the backup ring at an angle of 3 to 45°.

[3] The sealing structure according to [1] or [2], wherein the backup ring is disposed in such a manner that an outer surface thereof is in contact with a side surface on a low-pressure side of the annular groove.

[4] A sealing structure having a sealing device which is a plane seal disposed in an annular groove provided in one member of two members and which seals a gap between the two members, wherein
a tapered surface whose diameter increases toward a low-pressure side is provided on the low-pressure side of a bottom surface in the annular groove,
the sealing device includes a seal member made of a rubber-like elastic body disposed on a high-pressure side, and a backup ring made of a resin and mounted adjacent to the seal member on a low-pressure side of the seal member,
a bottom surface of the backup ring is a tapered surface whose diameter increases from one opening of the backup ring toward the other opening of the backup ring,
an angle formed by the tapered surface of the backup ring and the tapered surface of the annular groove is larger than 0°,
the backup ring is disposed so as to have a gap between an outer surface of the backup ring and a side surface on the low-pressure side of the annular groove, and
the seal member and the backup ring are disposed between the two members, each pressurized from the two members.

[5] The sealing structure according to [4], wherein an angle formed by the tapered surface of the backup ring and the tapered surface of the annular groove is 5 to 25°.

The sealing structure of the present invention (the first and second inventions) has an effect that a seal member in a plane seal is prevented from protruding when the seal member is pressurized, and further, the pressure resistance is improved.

DETAILED DESCRIPTION

Embodiments of the present invention will be described below with reference to the drawings. It should be understood that the present invention is not limited to the following embodiments, and that appropriate design changes, improvements, and the like can be added based on ordinary knowledge of a person skilled in the art without departing from the spirit of the present invention.

Figure 1:
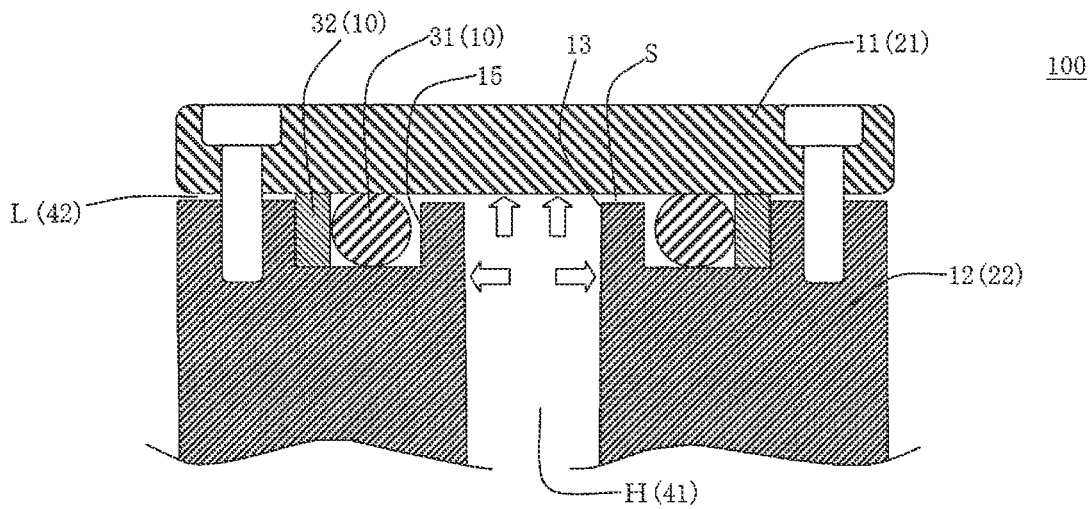
FIG. 1 is a cross-sectional view schematically showing one embodiment of a sealing structure of the present invention (the first invention).

(1) Sealing Structure of the First Invention:

One embodiment of the sealing structure of the present invention (the first invention) is a sealing structure 100 shown in FIG. 1. The sealing structure 100 has a sealing device 10 which is a plane seal disposed in an annular groove 15 provided in one member of the two members 11 and 12 for sealing a gap S between these two members 11 and 12. The sealing device 10 includes a seal member 31 made of a rubber-like elastic body and disposed on the high-pressure side H, and a backup ring 32 made of a resin and mounted adjacent to the seal member 31 on the low-pressure side L of the seal member 31. The backup ring 32 has a ring-like shape with ends in which a notch 20 is formed in a part thereof (see FIG. 3). The notch 20 extends parallel to the thickness direction of the backup ring 32, and extends so as to intersect the radial direction of the backup ring 32. The seal member 31 and the backup ring 32 are disposed between the two members 11 and 12 in a state of being pressurized from the two members 11 and 12, respectively. Since the seal member 31 and the backup ring 32 are disposed under pressure, they are in contact with the two members 11 and 12, respectively, and no gap is generated between the two members 11 and 12.

In the sealing structure 100, a seal member 31 in a plane seal is prevented from protruding when the seal member 31 is pressurized, and further, a backup ring 32 absorbs the pressure at high pressure, so that the pressure resistance is improved. Here, a plane seal used as a fixed seal is classified into a plane seal for internal pressure and a plane seal for external pressure. FIG. 1 shows the plane seal for internal pressure.

(1-1) Two Members (Lid and Storage Body):

The two members 11 and 12 are not particularly limited. Specifically, as shown in FIG. 1, one member 11 may be a lid 21 and the other member 12 may be a storage body 22. An annular groove 15 is formed in the vicinity of an opening 13 of the storage body 22, and a sealing device 10 is disposed in the annular groove 15. The annular groove 15 may be formed on the lid 21 side.

The shape of the bottom surface of the annular groove 15 can be a plane in the cross section in the depth direction. Further, both sides thereof can be formed parallel to the depth direction. That is, in both sides of the annular groove 15, the distance between both sides can be constant from the opening to the bottom surface of the annular groove 15.

Figure 8:
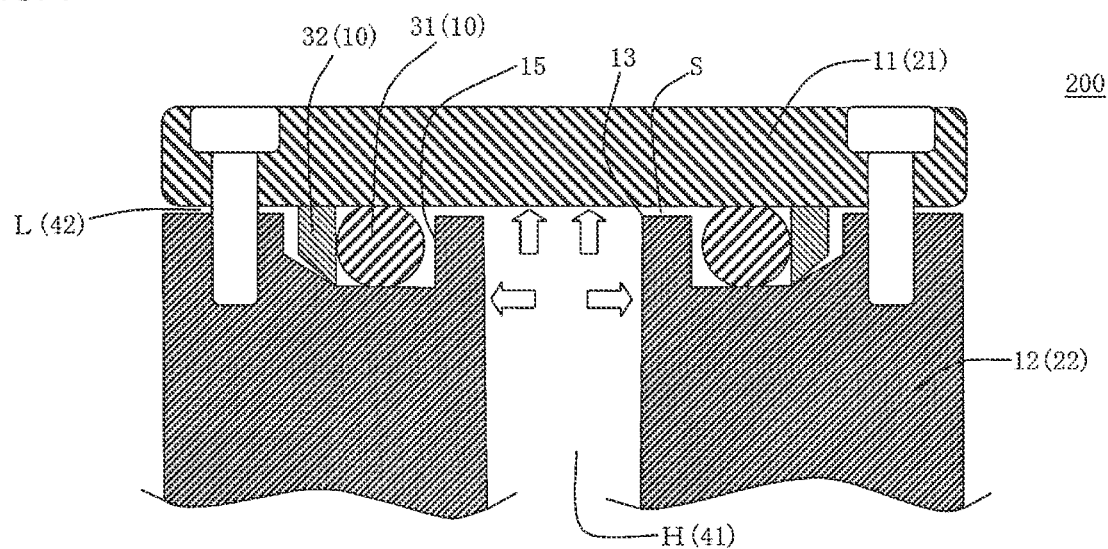
FIG. 8 is a cross-sectional view schematically showing one embodiment of the sealing structure of the present invention (the second invention).

The annular groove 15 may be provided with a tapered surface whose diameter increases toward the low-pressure side L on the low-pressure side L of the bottom surface 16, as in the embodiment shown in FIG. 8.

Figure 6:
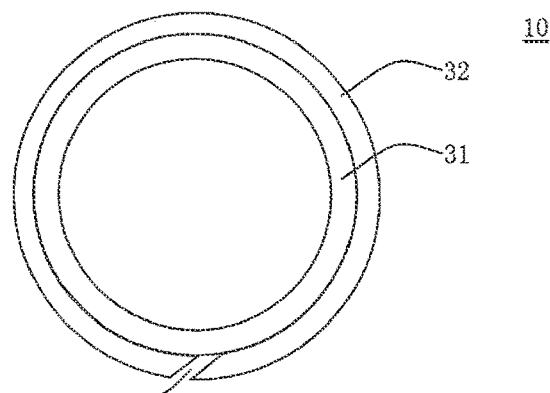
FIG. 6 is a plan view schematically showing a seal member and the backup ring in one embodiment of the sealing structure of the first invention.

(1-2) Sealing Device:

The sealing device 10 includes a seal member 31 made of a rubber-like elastic body and disposed on the high-pressure side H, and a backup ring 32 made of a resin and mounted adjacent to the seal member 31 on the low-pressure side L of the seal member 31 (see FIG. 6).

Figure 2:
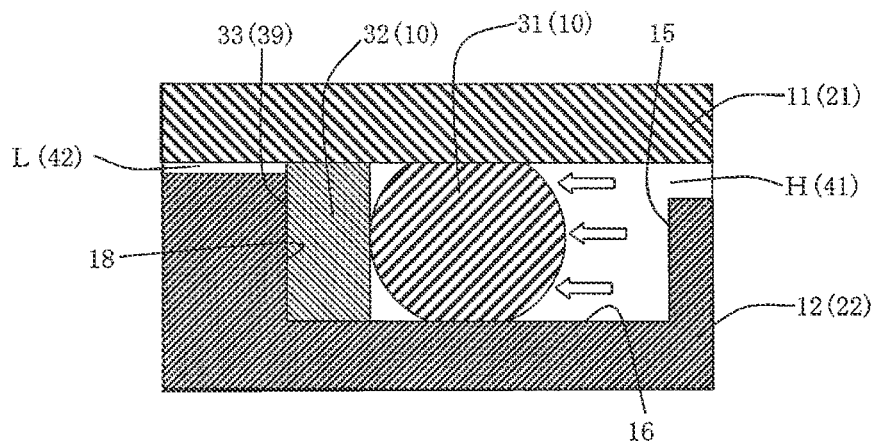
FIG. 2 is an enlarged cross-sectional view schematically showing an enlarged part of one embodiment of the sealing structure of the first invention.

As shown in FIG. 2, when the pressure in the space 41, which is one of the spaces partitioned by the sealing device 10, increases (that is, the space 41 becomes high pressure), the sealing device 10 is pressed against the side surface 18 of the annular groove 15 by the pressure so as to move to the other space 42 side (the low-pressure side L) where the pressure is small. Then, in the sealing device 10 which is pressed against the side surface 18 of the annular groove 15, the seal member 31 and the backup ring 32 are deformed. In the conventional sealing device, a gap is generated between a backup ring and a lid, and a seal member may enter the gap (that is, protruding of the seal member). However, in the present invention (the first invention), the seal member 31 is prevented from protruding as in the conventional sealing device by including the backup ring 32 which is a specific backup ring.

The seal member 31 and the backup ring 32 constituting the sealing device 10 are disposed between the two members 11 and 12 in a state of being pressurized from the two members 11 and 12, respectively. Disposing the seal member 31 and the backup ring 32 in such a state makes it possible to seal the gap between the two members 11 and 12 and maintain the state.

The crushing margin of the seal member 31 and the backup ring 32 is not particularly limited as long as the sealing performance is ensured under the pressure condition, and can be the same as the crushing margin of the conventionally known seal member and the backup ring.

Hereinafter, each member of the sealing device 10 will be described.

(1-2a) Seal Member:

The seal member 31 is an annular member made of a rubber-like elastic body and disposed on the high-pressure side H, and a conventionally known seal member can be appropriately selected and used. The seal member 31 may be, for example, an O-ring.

As the material of the seal member 31, the same material as that of a conventionally known seal member can be suitably used. Specific examples thereof include synthetic resins such as rubber and the like.

The seal member 31 is not particularly limited to its cross-sectional shape in the thickness direction, and it may be circular, elliptical or the like, for example.

(1-2b) Backup Ring:

The backup ring 32 is a resin member mounted adjacent to the seal member 31 (see FIGS. 1, 2, and 6) on the low-pressure side L of the seal member 31. The backup ring 32 has a ring-like shape with ends which has a notch 20. That is, in the backup ring 32, a part of the annular backup ring is cut off to form a space (a notch 20) between both end faces.

Figure 7:
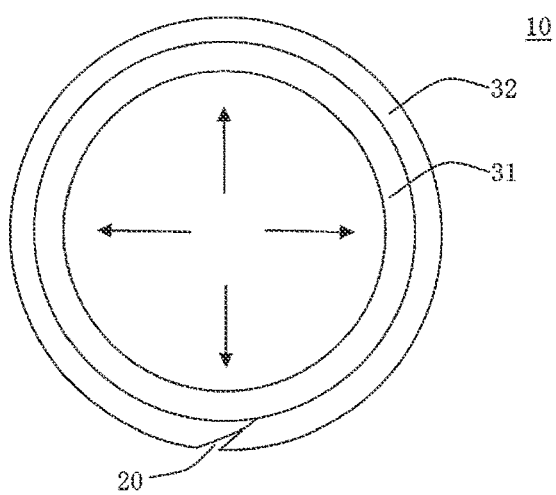
FIG. 7 is an explanatory view schematically showing the seal member and the backup ring in a state where the internal pressure is applied to the sealing device in one embodiment of the sealing structure of the first invention.

According to the backup ring 32 in which the notch 20 is formed as described above, when the pressure in the space 41, which is one of the spaces, is increased (when the space 41 becomes high pressure), the end of the backup ring 32 is well deformed by the pressure. Specifically, as shown in FIG. 7, a part of the end of the backup ring 32 is deformed to fill the notch 20. When the notch 20 is filled in this manner, the seal member 31 is prevented from protruding. Here, conventionally, the seal member 31 is prevented from protruding by further including the backup ring 32. However, in the case of high-pressure components, there is still a tendency for generating a gap between the backup ring and a member such as a lid due to a large deformation of the member such as a lid during use. When the gap is generated in this way, the conventional backup ring may not be able to sufficiently follow the deformation of the member such as a lid, and there is a possibility that the gap cannot be prevented. As a consequence, the seal member may enter the gap between the backup ring and the member such as a lid, causing the seal member to protrude. Also in such a case, the seal member 31 is prevented from protruding by forming a notch 20 in the backup ring 32 even when the gap is generated due to the large deformation of the member such as a lid, as compared with the case of a mere cut part rather than the notch 20 (i.e., the case where both end faces of the backup ring are in contact), for example. This is because the end 37 of the cut part of the backup ring 32 which has a ring-like shape with ends, on the side where the seal member 31 such as an O-ring is in contact has a lower end rigidity by being thin and further is more easily deformed by having a notch 20 (a gap).

Figure 3:
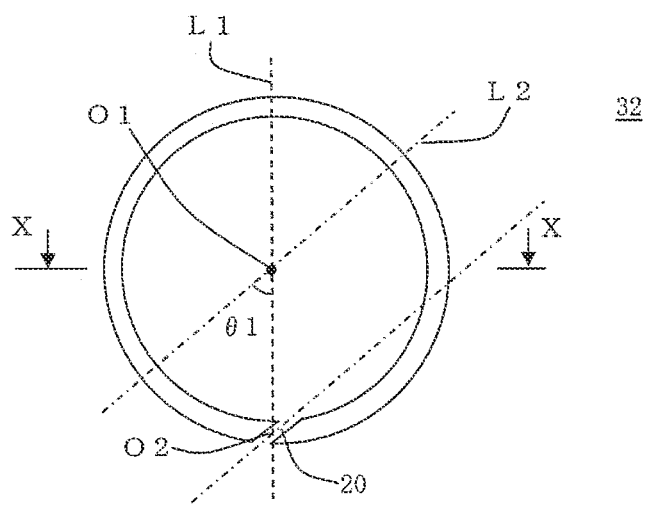
FIG. 3 is a plan view schematically showing a backup ring in one embodiment of the sealing structure of the first invention.
Figure 4:
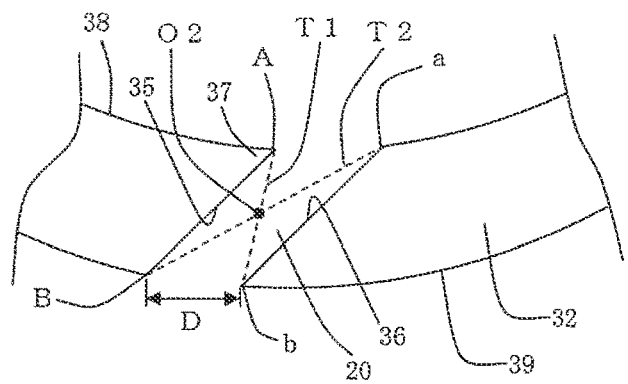
FIG. 4 is an enlarged view schematically showing an enlarged part of FIG. 3.
Figure 5:
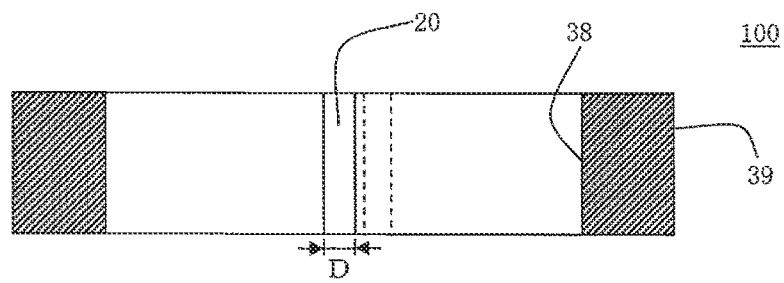
FIG. 5 is a cross-sectional arrow view schematically showing a section taken along the line X-X of FIG. 3.

The notch 20 extends parallel to the thickness direction of the backup ring 32 and extends so as to intersect the radial direction of the backup ring 32, as shown in FIGS. 3 to 5.

"Intersect the radial direction of the backup ring 32" means that a straight line L1 that passes through the center O1 of the backup ring 32 and the center O2 of the notch 20 and a straight line L2 that passes through the center O1 of the backup ring 32 and is parallel to the extending direction of the notch 20 intersect, as shown in FIG. 3. Incidentally, the center O2 of the notch 20 means the intersection of a straight line T1 connecting the end point A of the inner surface 38 side of one end face 35 and the end point b of the outer surface 39 side of the other end face 36 and a straight line T2 connecting the end point B of the outer surface 39 side of one end face 35 and the end point a of the inner surface 38 side of the other end face 36, as shown in FIG. 4.

The width D of the notch 20 (i.e., the maximum distance between both end faces of the backup ring 32) is not particularly limited, and can be appropriately set.

The notch 20 preferably intersects the radial direction of the backup ring 32 such that the angle θ1 formed with the radial direction of the backup ring 32 (i.e., the angle θ1 formed by the straight line L1 and the straight line L2 (acute angle)) (see FIG. 3) is 3 to 45°. Thereby, a part of the end of the backup ring 32 is easily deformed, and the seal member 31 is favorably prevented from protruding.

The cross-sectional shape of the backup ring 32 in the thickness direction is not particularly limited, but may be a polygon such as a square or a hexagon.

As the material of the backup ring 32, the same material as that of the backup ring known in the related art can be suitably used. Specific examples thereof include synthetic resins such as nylon 6 (PA6) and polytetrafluoroethylene (PTFE).

The backup ring 32 is preferably disposed so that the end face 33 on the low-pressure side L (outer surface 39) is in contact with the side surface 18 on the low-pressure side L of the annular groove 15, as shown in FIGS. 1 and 2. That is, the backup ring 32 is preferably disposed so that there is no gap between the backup ring 32 and the side surface 18 on the low-pressure side L of the annular groove 15. With this configuration, when the pressure in the space 41, which is one of the spaces, is increased (when the space 41 becomes high pressure), the end of the backup ring 32 is favorably deformed by the pressure, and the seal member 31 is favorably prevented from protruding.

(2) Method of Using the Sealing Structure:

A method of using a sealing structure of the present invention will be described below based on the sealing structure 100. One of the two members is a lid 21, and the other is a storage body 22.

First, a sealing device 10 is fitted into an annular groove 15 formed in the storage body 22. Then, the lid 21 is mounted on the storage body 22, and the lid 21 is fixed to the storage body 22. In this way, the inside of the storage body 22 is sealed.

The sealing device 10 receives an internal pressure from the inside of the storage body 22. This internal pressure is indicated by arrows in FIG. 7. When the pressure in the space 41, which is one of the spaces partitioned by the sealing device 10, is increased, the sealing device 10 is pressed against the side surface 18 of the annular groove 15 and deformed by the pressure so as to move to the other space 42 side where the pressure is small. At this time, in the backup ring 32 having a ring-like shape with ends, a part of the end thereof is deformed to fill the notch 20, as shown in FIG. 7. When the notch 20 is filled in this manner, the seal member 31 is prevented from protruding. Further, the pressure resistance of the seal member 31 is improved.

(3) Sealing Structure of the Second Invention:

One embodiment of the sealing structure of the present invention (the second invention) is a sealing structure 200 shown in FIG. 8. The sealing structure 200 has a sealing device which is a plane seal disposed in an annular groove 15 provided in one member of the two members 11 and 12 for sealing gap S between these two members 11 and 12. A groove tapered surface 51 which is a tapered surface whose diameter increases toward the low-pressure side L, is provided on the low-pressure side L of the bottom surface 16 in the annular groove 15 (see FIG. 9). The sealing device 10 includes a seal member 31 made of a rubber-like elastic body and disposed on the high-pressure side H, and a backup ring 32 made of a resin and mounted adjacent to the seal member 31 on the low-pressure side L of the seal member 31. The bottom surface 16 of the backup ring 32 is a tapered surface whose diameter increases from one opening of the backup ring 32 toward the other opening of the backup ring 32. The angle θ2 formed by the tapered surface of the backup ring 32 and the tapered surface of the annular groove 15 is larger than 0°. The backup ring 32 is disposed so as to have a gap 55 between the end face 33 on the low-pressure side L (outer surface 39) and the side surface 18 on the low-pressure side L of the annular groove 15. The seal member 31 and the backup ring 32 are disposed between the two members 11 and 12 in a state of being pressurized from the two members 11 and 12, respectively. Since the seal member 31 and the backup ring 32 are disposed under pressure, they are in contact with the two members 11 and 12, respectively, and no gap is generated between the two members 11 and 12.

In the sealing structure 200, a seal member 31 in a plane seal is prevented from protruding when the seal member 31 is pressurized, and further, a backup ring 32 absorbs the pressure at high pressure, so that the pressure resistance is improved. Here, a plane seal used as a fixed seal is classified into a plane seal for internal pressure and a plane seal for external pressure. FIG. 8 shows the plane seal for internal pressure.

Here, conventionally, the seal member 31 is prevented from protruding by further including the backup ring 32. However, in the case of high-pressure components, there is still a tendency for generating a gap between the backup ring and a member such as a lid due to a large deformation of the member such as a lid during use. When the gap is generated in this way, the conventional backup ring may not be able to sufficiently follow the deformation of the member such as a lid, and there is a possibility that the gap cannot be prevented. As a consequence, the seal member may enter the gap between the backup ring and the member such as a lid, causing the seal member to protrude. Also in such a case, with the configuration of the present invention, the backup ring 32 goes up the tapered surface and follows the gap, so that the seal member 31 is prevented from protruding even when the gap is generated due to the large deformation of the member such as a lid. Specifically, since the backup ring 32 is disposed so as to have a gap 55 between the end face of the backup ring 32 on the low-pressure side L and the side surface 18 on the low-pressure side L of the annular groove 15, it can be moved (deformed) so as to increase the diameter when pushed from the seal member 31, by being provided with the gap 55. Furthermore, since the angle $\theta 2$ formed by the tapered surface of the backup ring 32 and the tapered surface of the annular groove 15 is larger than 0°, the seal member 31 is prevented from protruding even when the gap is generated due to the large deformation of the member such as a lid, as compared with the case where the entire bottom surface of the backup ring 32 is being in contact with the tapered surface of the annular groove 15.

(3-1) Two Members (First Member and Second Member):

The two members 11 and 12 are not particularly limited. Specifically, as shown in FIG. 8, one member 11 may be a lid 21 and the other member 12 may be a storage body 22. An annular groove 15 is formed in the vicinity of an opening 13 of the storage body 22, and a sealing device 10 is disposed in the annular groove 15. The annular groove 15 may be formed in the lid 21.

In the present invention (the second invention), a groove tapered surface 51, which is a tapered surface whose diameter increases toward the low-pressure side L, is provided on the low-pressure side L of the bottom surface 16 in the annular groove 15.

When the annular groove 15 having such a groove tapered surface 51 is provided and a backup ring 32 is disposed on the groove tapered surface 51 (see FIGS. 8 and 9), in the case where a seal member 31 moves so that the diameter increases by the internal pressure in storage body 22, the backup ring 32 is pushed by the seal member 31 and goes up the groove tapered surface 51 (see FIG. 10) and a gap between the backup ring 32 and the lid 21 is prevented from being generated. As a result, the seal member 31 is prevented from protruding when the seal member 31 is pressurized.

In the annular groove 15, an angle $\theta 3$ formed by the extension line of the bottom surface 16 of the annular groove 15 and the groove tapered surface 51 can be 45 to 85°, and further 50 to 80°. With such an angle, the seal member 31 is further favorably prevented from protruding when the seal member 31 is pressurized.

Figure 9:
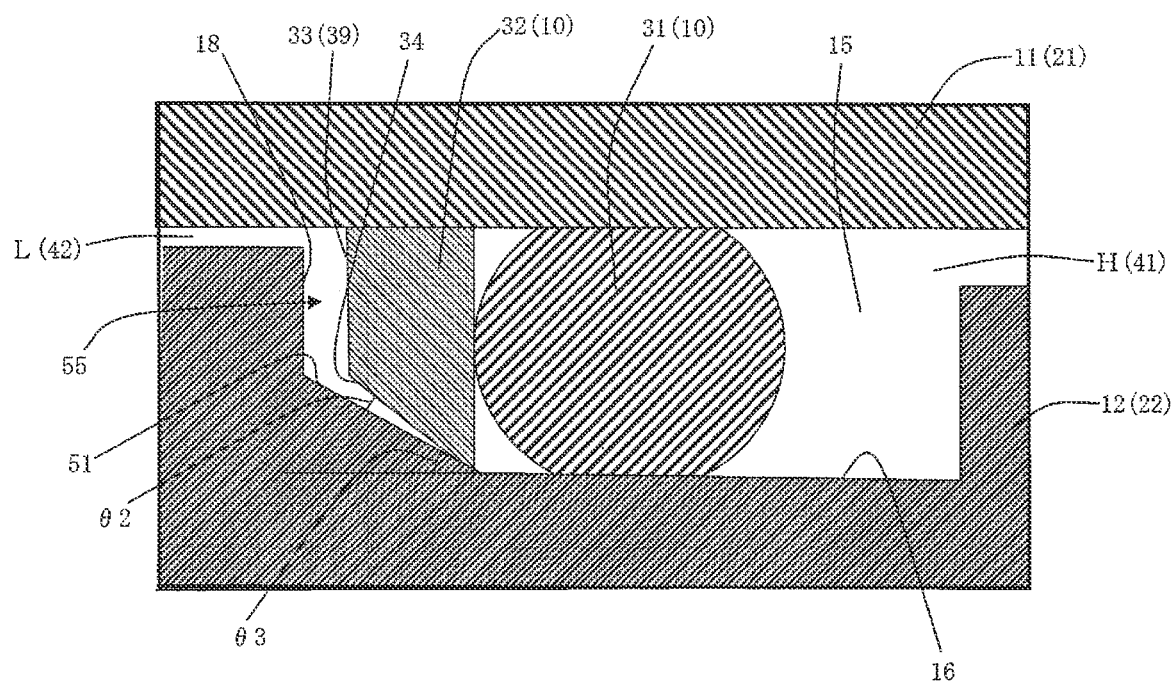
FIG. 9 is an enlarged cross-sectional view schematically showing an enlarged part in one embodiment of the sealing structure of the second invention.

More specifically, the angle $\theta 3$ is an angle formed by the extension line of the bottom surface 16 of the annular groove 15 and the groove tapered surface 51 (acute angle) in the cross section of the annular groove 15 in the depth direction (see FIG. 9).

(3-2) Sealing Structure:

The sealing device 10 includes a seal member 31 made of a rubber-like elastic body and disposed on the high-pressure side H, and a backup ring 32 made of a resin and mounted adjacent to the seal member 31 on the low-pressure side L of the seal member 31.

Figure 10:
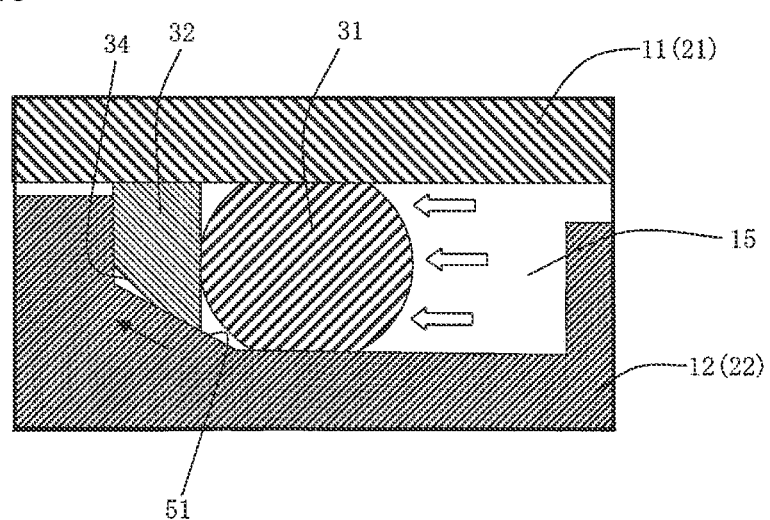
FIG. 10 is an explanatory view schematically showing the seal member and the backup ring in a state where the internal pressure is applied to the sealing device in one embodiment of the sealing structure of the second invention.

When the pressure in the space 41, which is one of the spaces partitioned by the sealing device 10, is increased (i.e., the space 41 becomes high pressure), the sealing device 10 is pressed against the side surface 18 of the annular groove 15 by the pressure so as to move to the other space 42 side (low-pressure side L) where the pressure is small (see FIGS. 9 and 10). Then, in the sealing device 10 which is pressed against the side surface 18 of the annular groove 15, the seal member 31 and the backup ring 32 are deformed. Here, in the conventional sealing device, a gap is generated between a backup ring and a lid, and a seal member may enter the gap (that is, the seal member may protrude). However, in the present invention (the second invention), the sealing device includes a groove tapered surface 51 and a backup ring 32 which is a particular backup ring disposed on the groove tapered surface 51, and the backup ring 32 is disposed so as to have a gap 55 between the side surface 18 of the annular groove 15, so that the seal member 31 is prevented from protruding as described above.

The seal member 31 and the backup ring 32 constituting the sealing device 10 are disposed between the two members 11 and 12 in a state of being pressurized from the two members 11 and 12, respectively. Disposing the seal member 31 and the backup ring 32 in such a state makes it possible to seal the gap between the two members 11 and 12 and maintain the state.

The crushing margin of the seal member 31 and the backup ring 32 is not particularly limited as long as the sealing performance is ensured under the pressure condition, and can be the same as the crushing margin of the conventionally known seal member and the backup ring.

Hereinafter, each member of the sealing device 10 will be described.

(3-2a) Seal Member:

The seal member 31 is an annular member made of a rubber-like elastic body disposed on the high-pressure side H, and a conventionally known seal member can be appropriately selected and used. The seal member 31 may be, for example, an O-ring.

As the material of the seal member 31, the same material as that of a conventionally known seal member can be suitably used. Specific examples thereof include synthetic resins such as rubber and the like.

The seal member 31 is not particularly limited to its cross-sectional shape in the thickness direction, and it may be circular, elliptical or the like, for example.

(3-2b) Backup Ring:

As described above, the backup ring 32 is made of a resin and is mounted adjacent to the seal member 31 on the low-pressure side L of the seal member 31. The backup ring 32 is disposed in a predetermined state, so that the seal member 31 is prevented from protruding. Furthermore, the pressure resistance of the seal member 31 is improved.

The bottom surface 34 of the backup ring 32 is a tapered surface (a bottom tapered surface) whose diameter increases from one opening of the backup ring 32 toward the other opening of the backup ring 32. That is, the backup ring 32 has a conical inclined surface on one opening side.

In the bottom tapered surface which is the bottom surface 34 of the backup ring 32, an angle θ2 formed by the bottom surface 34 of the backup ring 32 and the tapered surface of the annular groove 15 is larger than 0°. In other words, when the angle formed by the extension line of the bottom surface 16 of the annular groove 15 and the bottom surface 34 of the backup ring 32 is an angle α, and the angle formed by the extension line of the bottom surface 16 of the annular groove 15 and the tapered surface of the annular groove 15 is an angle β, the angle α will be larger than the angle β, comparing the angle α and the angle β. The angle θ2 is preferably 5 to 25°, and more preferably 5 to 15°. In this case, since the backup ring 32 is hardly collapsed, the seal member 31 is prevented from protruding. Furthermore, the pressure resistance of the seal member 31 is improved.

The backup ring 32 is disposed so as to have a gap 55 between an end face 33 (an outer surface 39) on the low-pressure side L of the backup ring 32 and a side surface 18 on the low-pressure side L of the annular groove 15. When such a gap 55 is provided, coupled with that the angle formed by the bottom surface 34 (the bottom tapered surface) of the backup ring 32 and the groove tapered surface 51 of the annular groove 15 is larger than 0°, the backup ring 32 is moved (deformed) so as to increase the diameter when pushed from the seal member 31, by being provided with the gap 55. Then, the gap between the backup ring 32 and the member such as the lid 21 is prevented from being formed, so that the seal member 31 is prevented from entering the gap (that is, the seal member 31 is prevented from protruding).

The backup ring 32 may be an annular body having no notch as described above, or may have a ring-like shape with ends in which a part thereof is cut to form a slit. In the case of the ring-like shape with ends, it may be a ring-like shape with ends which has a notch 20 like the backup ring 32 in the above-mentioned first invention, or may be a ring-like shape with ends in a state in which both end faces 35 and 36 are in contact with each other (a state in which a space is not provided between both end faces 35 and 36 like the notch 20). When the backup ring has such a ring-like shape with ends, the diameter is easily increased when the backup ring 32 is subjected to a force from the seal member 31. It is possible to avoid the seal member 31 from being damaged by the backup ring 32 by providing a slit in the same direction as the notch 20 of the backup ring 32 in the above-described first invention.

As the material of the backup ring 32, the same material as that of the conventionally known backup ring can be suitably used. Specific examples thereof include synthetic resins such as nylon 6 (PA6) and polytetrafluoroethylene (PTFE).

(4) Method of Using the Sealing Structure:

A method of using the sealing structure of the present invention will be described below based on the sealing structure 200. In the two members, one member 11 is a lid 21 and the other member 12 is a storage body 22.

First, a sealing device 10 is fitted into an annular groove 15 formed in the storage body 22. Then, the lid 21 is mounted on storage body 22, and the lid 21 is fixed to the storage body 22. In this way, the inside of the storage body 22 is sealed.

The sealing device 10 receives an internal pressure from the inside of the storage body 22. This internal pressure is indicated by white arrows in FIG. 10. When the pressure in the space 41, which is one of the spaces partitioned by the sealing device 10, is increased, the backup ring is pressed by the seal member 31 and goes up the groove tapered surface 51, so that the sealing device 10 prevents a gap from being generated between the backup ring 32 and the lid 21. As a result, the seal member 31 is prevented from protruding when the seal member 31 is pressurized. Further, the pressure resistance of the seal member 31 is improved since the backup ring 32 absorbs the pressure.

EXAMPLES

Hereinafter, the present invention will be specifically described based on examples, but the present invention is not limited to these examples.

Example 1

A sealing structure as shown in FIG. 1 was produced. In the sealing structure, a sealing device having an annular seal member made of a rubber material and a backup ring made of a rubber material was disposed in an annular groove formed in an opening of a storage body in the two members of the lid and the storage body. The seal member and the backup ring, constituting the sealing device were disposed between the lid and the storage body while being pressurized from the lid and the storage body, respectively. The seal member was an O-ring having a circular cross-sectional shape. The backup ring was a ring-like shape with ends which has a notch. The backup ring is mounted adjacent to the seal member on the low-pressure side of the seal member, and is disposed in such a manner that the end face (outer surface) thereof on the low-pressure side contacts the side surface on the low-pressure side of the annular groove. Further, the notch extends parallel to the thickness direction of the backup ring and extends to intersect the radial direction of the backup ring. An angle formed by the notch and the radial direction of the backup ring (the angle θ1) was 3 to 45°.

In the produced sealing structure, when an internal pressure is generated in the storage body, the seal member spreads outward (moves outward) and presses the adjacent backup ring so as to increase the diameter of the backup ring. At this time, the backup ring is deformed so as to fill the notch (see FIG. 7). In this manner, it is considered that the seal member can be prevented from protruding. Furthermore, it is considered that the pressure resistance can be improved since the backup ring absorbs the pressure.

Comparative Example 1

A sealing structure was produced in the same manner as in Example 1 except that the backup ring had a ring-like shape with ends which has both end faces in contact with each other without a space therebetween (without a notch). It is considered that the sealing structure does not have a sufficient effect of preventing the seal member from protruding when the internal pressure in the container is increased and the seal member is pressurized in the same manner as in Example 1. In addition, it is considered that the improvement of the pressure resistance is not observed.

Example 2

A sealing structure as shown in FIG. 8 was produced. In the sealing structure, a sealing device having an annular seal member made of a rubber material and a backup ring made of a rubber material was disposed in an annular groove formed in an opening of a storage body in the two members of the lid and the storage body. The seal member and the backup ring, constituting the sealing device were disposed between the lid and the storage body while being pressurized from the lid and the storage body, respectively. The seal member was an O-ring having a circular cross-sectional shape. The backup ring was mounted adjacent to the seal member on the low-pressure side of the seal member.

On the low-pressure side of the bottom surface in the annular groove, a tapered surface (a groove tapered surface) whose diameter increases toward the low-pressure side was provided.

The bottom surface of the backup ring was a tapered surface whose diameter increases from one opening of the backup ring toward the other opening of the backup ring. In addition, the angle formed by the tapered surface of the backup ring and the tapered surface of the annular groove (the angle θ2) is larger than 0°, particularly 5 to 25°. The backup ring was disposed so as to have a gap between the end face (the outer surface) on the low-pressure side and the side surface on the low-pressure side of the annular groove.

In the produced sealing structure, when an internal pressure is generated in the storage body, the seal member spreads outward (moves outward) and presses the adjacent backup ring so as to increase the diameter of the backup ring. At this time, the backup ring moves up the groove tapered surface. It is considered that this movement prevents a gap from being formed between the backup ring and the lid so that the seal member is prevented from entering the gap (that is, the seal member is prevented from protruding). Furthermore, it is considered that the pressure resistance is improved since the backup ring absorbs the pressure.

Comparative Example 2

A sealing structure was produced in the same manner as in Example 2 except that an angle formed by the tapered surface of the backup ring and the tapered surface of the annular groove (the angle θ2) was set to 0°. It is considered that the sealing structure does not have a sufficient effect of preventing the seal member from protruding when the internal pressure in the container increases and the seal member is pressurized in the same manner as in Example 2. In addition, it is considered that the improvement of the pressure resistance is not observed.

As can be understood from Examples 1 and 2 and Comparative Examples 1 and 2, it is presumed that the sealing structures of Examples 1 and 2 prevent the seal member from protruding when the seal member is pressurized, compared with the sealing structures of Comparative Examples 1 and 2. Further, it is presumed that the pressure resistance is improved since the backup ring absorbs the pressure at high pressure.

INDUSTRIAL APPLICABILITY

The sealing structure of the present invention can be employed as a sealing structure used for a part requiring sealing in various devices such as a vehicle.

The invention claimed is:

1. A sealing structure comprising:
a sealing device that is a plane seal disposed in an annular groove provided in one member of two members and which seals a gap between the two members,
wherein the sealing device includes a seal member made of a rubber-like elastic body disposed on a high-pressure side of the annular groove that is located radially inward from the seal member, and a backup ring made of a resin and mounted adjacent to the seal member on a low-pressure side of the seal member, the backup ring being located radially outward from the seal member,
the backup ring has a ring-like shape having an inner surface facing the seal member and an outer surface facing a side surface of the annular groove, and the backup ring having end faces separated by a split,
the split extends parallel to a thickness direction of the backup ring, and extends so as to intersect a radial direction of the backup ring, such that a straight line L1 that passes through a center O1 of the backup ring and a center O2 of the split and a straight line L2 that passes through the center O1 of the backup ring and is parallel to the extending direction of the split intersect, wherein the center O2 of the split is an intersection of a straight line T1 connecting an end point A of an inner surface side of one end face and an end point b of an outer surface side of the other end face and a straight line T2 connecting an end point B of the outer surface side of the one end face and an end point a of the inner surface side of the other end face,
the seal member and the backup ring are disposed between the two members, each compressed from the two members,
the split intersects the radial direction of the backup ring at an angle of 3 to 45° such that each end face includes a first corner having an acute angle and a second corner having an obtuse angle, and
the seal member is configured to radially spread outward upon receipt of high-pressure from the high-pressure side of the annular groove so as to press the adjacent backup ring to increase the diameter of the backup ring and cause the first corner of one of the ends of the backup ring to contact the second corner of the other end and fill the split, and cause the first corner of the other end to be spaced apart from the second corner of the one end.

2. The sealing structure according to claim 1, wherein the backup ring is disposed in such a manner that the outer surface thereof is in contact with a side surface on a low-pressure side of the annular groove.

\* \* \* \* \*